United States Patent
Ju

(10) Patent No.: US 8,953,067 B2
(45) Date of Patent: *Feb. 10, 2015

(54) METHOD, DEVICE, AND MACHINE READABLE MEDIUM FOR IMAGE CAPTURE AND SELECTION

(71) Applicant: Mediatek Inc., Hsin-Chu (TW)

(72) Inventor: Chi-Cheng Ju, Hsinchu (TW)

(73) Assignee: Mediatek Inc., Science-Based Industrial Park, Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 14/322,922

(22) Filed: Jul. 3, 2014

(65) Prior Publication Data

US 2014/0313370 A1  Oct. 23, 2014

Related U.S. Application Data

(63) Continuation of application No. 13/424,393, filed on Mar. 20, 2012, now Pat. No. 8,810,686.

(60) Provisional application No. 61/563,327, filed on Nov. 23, 2011.

(51) Int. Cl.
  *H04N 5/76* (2006.01)
  *H04N 5/77* (2006.01)

(52) U.S. Cl.
  CPC ................... *H04N 5/772* (2013.01)
  USPC ........................ 348/231.3; 348/239

(58) Field of Classification Search
  USPC ........... 348/231.2, 231.3, 231.99, 231.6, 239; 386/242
  See application file for complete search history.

(56) References Cited

U.S. PATENT DOCUMENTS

| | | |
|---|---|---|
| 5,587,740 A | 12/1996 | Brennan |
| 7,826,092 B2 | 11/2010 | Ejima |
| 2006/0132623 A1 | 6/2006 | Nozaki |
| 2007/0019094 A1 | 1/2007 | Silberstein |
| 2007/0080850 A1* | 4/2007 | Abe et al. ............... 342/52 |
| 2007/0248244 A1* | 10/2007 | Sato et al. ............. 382/103 |
| 2009/0128642 A1 | 5/2009 | Koh |
| 2010/0272314 A1 | 10/2010 | Cournoyer |
| 2010/0309334 A1 | 12/2010 | James |
| 2010/0309335 A1 | 12/2010 | Brunner |
| 2012/0262569 A1* | 10/2012 | Cudak et al. ............ 348/135 |

FOREIGN PATENT DOCUMENTS

JP  2010178309  8/2010

* cited by examiner

*Primary Examiner* — Sinh Tran
*Assistant Examiner* — Zhenzhen Wu
(74) *Attorney, Agent, or Firm* — Winston Hsu; Scott Margo

(57) ABSTRACT

The invention is related to a method, a device, and a machine readable medium for image capture and selection. One of the disclosed embodiments of the invention is specifically related to an image selecting method performed by an image capturing device for selecting at least one image from a sequence of captured images. The method includes storing a plurality of the captured images in a buffer, wherein each of the buffered images has an interested region supposed to encompass an interested target; detecting intactness information describing intactness of the interested target as encompassed in the interested regions of a plurality of the buffered images; and selecting at least one of the buffered images based on the detected intactness information, wherein intactness indicating whether or to what extent the interested target encompassed in the interested region.

20 Claims, 4 Drawing Sheets

METHOD, DEVICE, AND MACHINE READABLE MEDIUM FOR IMAGE CAPTURE AND SELECTION

CROSS REFERENCE TO RELATED APPLICATIONS

This a continuation of U.S. application Ser. No. 13/424,393 (filed on Mar. 20, 2012), which claims the benefit of U.S. provisional application No. 61/563,327 (filed on Nov. 23, 2011). The entire contents of the related applications are incorporated herein by reference.

BACKGROUND

The invention relates generally to image capture, and more particularly, to capturing a sequence of images and selecting therefrom based on detected intactness information of an interested target.

Nowadays many kinds of electronic devices are equipped with the ability to capture images. Examples of these electronic devices include digital cameras, mobile phones, media players, media recorders, personal digital assistants (PDAs), tablet personal computers (tablet PCs), laptop computers, etc. For the sake of simplicity, these kinds of electronic devices will be collectively referred to as image capturing devices in the subsequent disclosure.

A user can use an image capturing device to capture images that encompass a target of interest to the user. The interested target can be a living object, such as a person or a pet, or a natural or artificial object, such as a tree or a building. The interested target can also be a combination of several objects, or constitute only a part of one or several objects. For example, the interested target can be a couple of lovers standing together, a cluster of flowers, a recognized human face, or a part of any object(s) encompassed in a region focused by the image capturing device.

Inevitably, there is always a time lag between the moment when the user wants the image capturing device to capture an image and the moment when the image capturing device actually captures an image. The speed limitations of both the user's nervous system and the image capturing device are the main causes of the time lag. During the time lag, things such as the interested target, anything else that is in front of the image capturing device, and the image capturing device itself, may move. The movements may affect the desirability of the actually captured image.

For example, some movements may cause an interrupting object to lie directly between the interested target and the image capturing device at the moment when the image is captured. As a result, a part of the view of the image capturing device that should have been occupied by a part of the interested target is instead occupied by the interrupting object. As appeared in the captured image, a part of the interested target will be covered by the interrupting object. If this happens, it will make the captured image less desirable or completely useless to the user. In response, the user frequently will spend additional time waiting and taking another photograph as a replacement.

To deal with the aforementioned situation, a user may want to capture several candidate photographs for the interested target within the same scene, retain all the captured images in a non-volatile storage, and delete the undesirable ones from the stored images later when the user has time. These undesired images will occupy at least a part of the non-volatile storage's limited space for some period of time. As a result, the user won't be able to use the non-volatile storage efficiently to store only those desirable images.

SUMMARY

To resolve the aforementioned problems of the related art and to achieve some other objectives, the invention provides a method, a device, and a machine readable medium for image capture and selection.

One disclosed embodiment of the invention is related to an image selecting method performed by an image capturing device for selecting at least one image from a sequence of captured images. The method includes storing a plurality of the captured images in a buffer, wherein each of the buffered images has an interested region supposed to encompass an interested target; detecting intactness information describing intactness of the interested target as encompassed in the interested regions of a plurality of the buffered images; and selecting at least one of the buffered images based on the detected intactness information, wherein intactness indicating whether or to what extent the interested target encompassed in the interested region.

Also disclosed is a non-transitory machine readable medium that stores executable computer program instructions. When being executed, the computer program instructions can cause an image capturing device to perform the aforementioned method.

Another disclosed embodiment of the invention is related to an image selecting device used in an image capturing device which includes an image sensor operative to capture a sequence of images. The image selecting device is used for selecting at least one image from the sequence of captured images. The image selecting device includes a buffer, a target-intactness detection component, and an image selection component. The image sensor is operative to capture a sequence of images. The buffer is connected to the image sensor and is operative to store a plurality of the captured images. Each of the buffered images has an interested region supposed to encompass an interested target. The target-intactness detection component is connected to the buffer and is operative to detect intactness information describing intactness of the interested target as encompassed in the interested regions of a plurality of the buffered images. The image selection component is connected to the buffer and is operative to select at least one of the buffered images based on the detected intactness information, wherein intactness indicating whether or to what extent the interested target encompassed in the interested region.

Other features of the invention will be apparent from the accompanying drawings and from the detailed description which follows.

BRIEF DESCRIPTION OF THE DRAWINGS

The invention can be fully understood by reading the subsequent detailed description with references made to the accompanying drawings, wherein.

DETAILED DESCRIPTION

Figure 1:
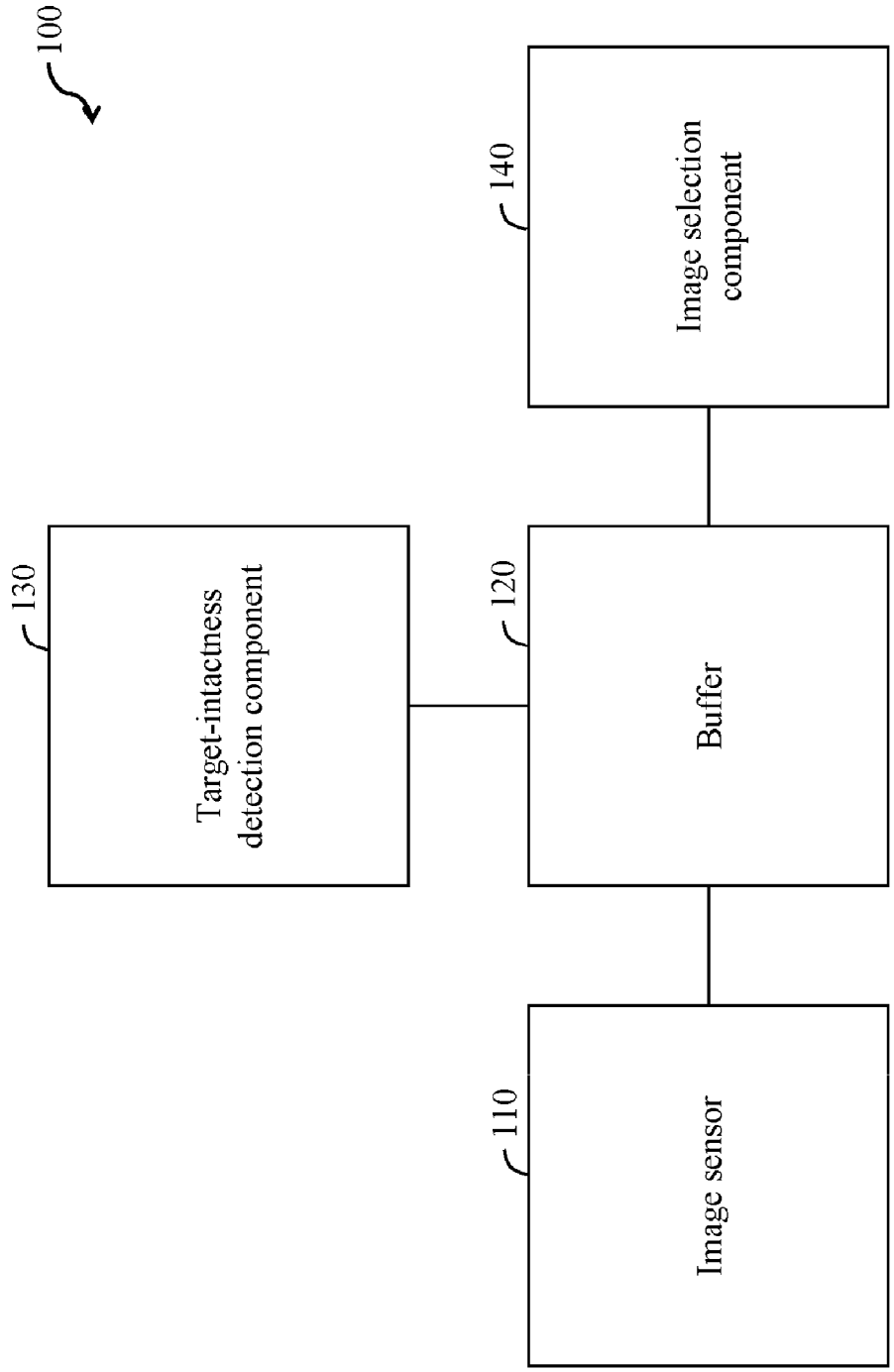
FIG. 1 is a schematic diagram of an image capturing device according to an embodiment of the invention.

FIG. 1 is a schematic diagram of an image capturing device according to an embodiment of the invention. The image capturing device 100 is a device that a user can use to capture images. For example, the image capturing device 100 is a digital camera, a mobile phone, a media player, a media recorder, a PDA, a tablet PC, or a laptop computer. In FIG. 1, only the components of the image capturing device 100 that are substantively related to the invention are depicted. These components include an image sensor 110, a buffer 120, a target-intactness detection component 130, and an image selection component 140. Other components that are either unrelated to or only tangentially related to the invention are omitted from FIG. 1 for the sake of simplicity.

Each of the components shown in FIG. 1 can be a stand-alone electronic component or a part of an electronic module having multiple functions. Furthermore, some of the components can be combined together. Examples of the image sensor 110 include a charge-coupled device (CCD) image sensor and a complementary metal-oxide-semiconductor (CMOS) image sensor. The buffer 120 can be any kind of storage device (s) used by the image capturing device 100, or constitute only a part of the storage device (s). In one example, the buffer 120 includes one or a plurality of memory units. The target-intactness detection component 130 can be a dedicated hardware component, or be embodied by a processor of the image capturing device 100. Similarly, the image selection component 140 can be a dedicated hardware component or be embodied by a processor of the image capturing device 100. The image sensor 110, the target-intactness detection component 130, and the image selection component 140 are all connected to the buffer 120. Each of the connection can be either a direct or an indirect connection, and the connection can be either wired or wireless. For example, if the connection between the image sensor 110 and the buffer 120 is indirect, there can be one or more intermediate components connected in between the image sensor 110 and the buffer 120.

Figure 2:
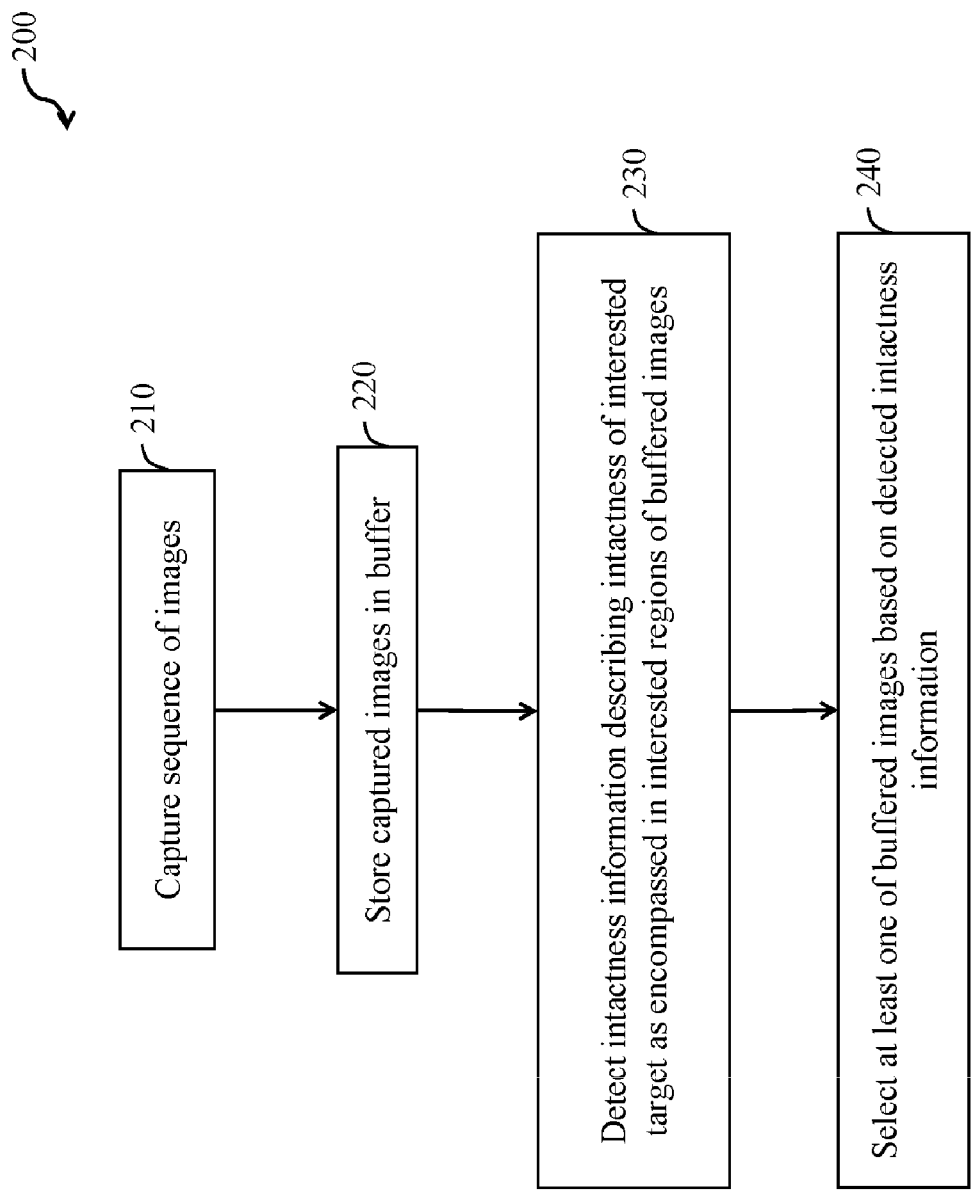
FIG. 2 is a flowchart of a process according to an embodiment of the invention.

FIG. 2 is a flowchart of a process according to an embodiment of the invention. Because process 200 shown in FIG. 2 can be performed by the image capturing device 100 shown in FIG. 1, for the sake of simplicity, the following paragraphs will use the components of the image capturing device 100 to help illustrating steps of process 200, and use steps of process 200 to help illustrating the components of the image capturing device 100. But please be noted that process 200 can also be performed by an electronic device other than the one shown in FIG. 1, and the image capturing device 100 can also perform a process other than the one shown in FIG. 2. In other words, the image capturing device 100 and process 200 does not limit each other.

The image capturing device 100 can start performing process 200 only if some conditions are satisfied. For example, the image capturing device 100 can start performing process 200 after the user has switched the image capturing device 100 to an image capturing mode and the image capturing device 100 has located a target of potential interest to the user for image capturing. Another exemplary condition that can be used additionally is that the user has pressed and held a mechanical shutter button of the image capturing device 100 halfway, or has pressed and held a virtual button on a touch screen of the image capturing device 100.

The interested target can be a single object or a combination of several objects, or constitute only a part of one or several objects. The term object can refer to a living object, a natural object, or an artificial object. For example, the interested target can be a person's face, and the image capturing device 100 can use a face recognition technology to locate the face. As another example, the interested target can be a target that is encompassed in a focus area selected by the image capturing device 100 automatically or by the user manually.

At step 210, the image capturing device 100 captures a sequence of images using the image sensor 110. For example, at step 210 the image capturing device 100 captures images successively and keeps doing so until after the image capturing device 100 receives an image capturing request from its user. In generating the captured images at step 210, the image capturing device 100 can adjust its image capturing settings, or use constant image capturing settings. Examples of the image capturing settings include shutter speed, aperture, white balance, contrast, etc.

At step 220, the image capturing device 100 stores a plurality of the captured images in the buffer 120. The buffered images constitute a subset of the captured images. According to mathematics, a set is always a subset of itself. Therefore, if the image capturing device 100 captures M images at step 210, it can store only N of the M images in the buffer 120 at step 220. Both M and N are positive integers and M is larger than or equal to N.

Each of the buffered images has an interested region supposed to encompass the interested target. Because each interested region is only "supposed" to encompass the interested target, the real situation can be that the region encompasses the interested target fully, encompasses only a part of the interested target while another part of the interested target is covered by an interrupting object, or encompasses none of the interested target but only the interrupting object. Similar to the interested target, the interrupting object can be a single object or a combination of several objects, or constitute only a part of one or several objects. The interrupting object may be an object of no interest to the user of the image capturing device 100. As another example, the interrupting object is what that the user of the image capturing device 100 is also interested in but does not want to cover the interested target.

The interested region of a buffered image can constitute only a part of the image, or occupy the whole image. The interested region can be a region in which a human face has been recognized by the image capturing device 100. As another example, the interested region can be a region focused by the image capturing device 100 when the buffered image was captured. The interested regions of the buffered images need not have the same location. For example, if the interested target or the image capturing device 100 is moving when the images are captured at step 210, the interested regions may have different locations within the buffered images.

Step 220 can start before step 210 ends, and hence the two steps can have some overlap in time. For example, step 210 and step 220 can be implemented by some iterative sub-steps. The iterative sub-steps can include a sub-step of capturing a $K^{th}$ image, a sub-step of buffering the $K^{th}$ image, then a sub-step of capturing a $(K+1)^{th}$ image, and so on. K is a positive integer.

Inevitably, the buffer 120 cannot provide enough space to store an infinite number of images. Therefore, whenever the buffer 120 can provide no more space for a newly captured image, the oldest one of the buffered images can be deleted to spare storage space for the newly captured one. Other ways of managing the space of the buffer 120 can also be used to facilitate the performance of step 220. Once a buffered image has been deleted from the buffer 120, it will no longer be included in the collective term "buffered images" used to explain the subsequent steps.

At step 230, using the target-intactness detection component 130, the image capturing device 100 detects intactness information describing intactness of the interested target as encompassed in the interested regions of a plurality of the buffered images. For the sake of simplicity, in this and the following paragraphs, the term "detected images" will be used to refer to a plurality of the buffered images in which intactness of the interested target is detected. Collectively, the detected images constitute a subset of the buffered images. In other words, if the image capturing device 100 stores N images in the buffer 120 at step 220, it can detect the intactness information for only P of the N buffered images at step 230. Both N and P are positive integers and N is larger than or equal to P.

As used in this context, "intactness" of the interested target as encompassed in one of the interested regions means whether, or to what extent, the interested target in the interested region is covered by another interrupting object. The interested target will be covered if the interrupting object lies directly between the interested target and the image capturing device 100 at the moment when the image is captured. As a result, a part of the view of the image capturing device 100 that should have been occupied by a part of the interested target is instead occupied by the interrupting object. As appeared in the buffered image, at least a part of the interested target is covered by the interrupting object.

This and the following paragraphs will illustrate some of the alternatives for implementing step 230. For example, if the interested target is a recognized human face and the interested regions are regions encompassing the face, the target-intactness detection component 130 can detect to what extend the content within each of the interested regions of the detected images resembles a human face. The target-intactness detection component 130 can then associate a face recognition score with each of the interested regions. Each of the face recognition scores can be referred to as an intactness score. Collectively, the intactness scores constitute the aforementioned "intactness information." For example, a high score may mean that the content within the associated interested region resembles a human face, indicating that the interested target may be relatively more intact as encompassed in the interested region. On the contrary, a low score may mean that the content within the associated interested region does not resemble a human face, indicating that the interested target may be relatively less intact as encompassed in the interested region.

As another example, the target-intactness detection component 130 can detect the intactness information by performing motion detection on the buffered images. If the target-intactness detection component 130 detects that no interrupting object has entered into the interested region of an $X^{th}$ detected image, the target-intactness detection component 130 can give the $X^{th}$ detected image a high intactness score. On the other hand, if the target-intactness detection component 130 detects that an interrupting object has entered into the interested region of a $Y^{th}$ detected image (which should have been occupied by the interested target) and stayed there until before a $Z^{th}$ detected image, the target-intactness detection component 130 can give the $Y^{th}$, the $(Y+1)^{th}$, ..., and the $(Z-1)^{th}$ detected images low intactness scores. X, Y, and Z are all positive integers and Z is larger than Y.

As still another example, at step 230 the target-intactness detection component 130 can detect the intactness information through comparing the interested regions of the buffered images. For example, before step 230 is performed, the image capturing device 100 can detect a feature value for each of the interested regions of the buffered images. Then, at step 230, the target-intactness detection component 130 can detect the intactness information through comparing the feature values of the interested regions. The feature value of an interested region is related to the content of the interested region. For example, the feature value of an interested region can be derived from the color histogram and/or luminance histogram of the interested region, or be extracted therefrom directly.

If there is a large discrepancy between the feature values of two interested regions, it's likely that the two interested regions do not resemble each other. Therefore, the difference between two feature values of two interested regions adjacent in time can be used as a basis for determining the intactness score of one, e.g. the later one, of the interested regions. Specifically, a large difference may indicate that the two interested regions do not resemble each other, and hence the interested target in the later one may be covered by an interrupting object. As a result, the target-intactness detection component 130 can associate the later one of the two interested regions with a low intactness score. A small difference may indicate that the two interested regions do resemble each other, and hence the interested target in the later one of the interested regions may still be uncovered and remain intact. As a result, the target-intactness detection component 130 can associate the later one of the two interested regions with a high intactness score. Collectively, the intactness scores associated with the interested regions constitute the aforementioned "intactness information."

It's frequently true that the interested target will be covered by the interrupting object for only a short period of time. To cope with this kind of situation, at step 230 the target-intactness detection component 130 can determine a mean, a median, or a mode of the feature values of the interested regions, and use the determined mean, median, or mode as a reference value. Then, the target-intactness detection component 130 can determine the intactness score for each interested region based on the difference between the interested region's feature value and the reference value; the smaller the difference, the higher the intactness score. As a result, there may be only a few buffered images with relatively low intactness scores, which indicate that these images are probably captured during the short period of time when the interested target is covered by the interrupting object. The rest of the buffered images may have relatively high intactness scores, which indicate that these images may be captured during the period of time when the interested target is not covered by the interrupting object.

Furthermore, if the intactness information is detected through determining similarity among the interested regions of the detected images, technologies based on the concepts of mean squared error (MSE), peak signal-to-noise ratio (PSNR), and structural similarity (SSIM) index can also be applied to facilitate the image similarity determination.

Step 230 can start before step 220 ends, and hence the two steps can have some overlap in time. For example, step 230 and step 220 can be implemented by some iterative sub-steps. The iterative sub-steps may include a sub-step of storing a $J^{th}$ image in the buffer 120, a sub-step of detecting intactness information for the $J^{th}$ image, then a sub-step of storing a $(J+1)^{th}$ image in the buffer 120, and so on. J is a positive integer. As another example, step 230 can start only after steps 210 and 220 have come to an end. For example, steps 210 and 220 can end and step 230 can start after the user issues an image capturing request to the image capturing device 100. The user can issue the image capturing request through an input/output (I/O) interface of the image capturing device 100.

At step 240, using the image selection component 140, the image capturing device 100 selects at least one from the buffered images based on the detected intactness information. The selected image(s) constitutes a subset of the buffered images. One of the objectives of step 240 is to select image(s)

in which the interested target is not covered by any other object (s) or is minimally covered. In addition to be based upon the detected intactness information, the image selection component 140 can perform the selection further based on the time stamps associated with the buffered images, and the time stamp associated with an image capturing request received by the image capturing device 100. A time stamp associated with a buffered image may specify the time at which the image was captured or buffered; the time stamp associated with the image capturing request may specify the time at which the request was received. One of the objectives of using the time stamps at step 240 is to ensure that the selected image(s) and the image capturing request are as close in time as possible.

Depending on the specific application of the embodiments, the image selection component 140 can select one or multiple images at step 240. For example, at step 240 the image selection component 140 can select only one from the buffered images in response to an image capturing request issued by the user so that the selected image can be stored in a non-volatile storage of the image capturing device 100 at a subsequent step. As an alternative, at step 240 the image selection component 140 can select a few from the buffered images for the user, and let the user determine which one(s) of the few selected images should be stored in the non-volatile storage of the image capturing device 100.

As another example, at step 240 the image selection component 140 can select several images from the buffered images for a subsequent operation of multiple-image processing. In the multiple-image processing operation, the selected images can be combined to create an image more desirable to the user. To facilitate the multiple-image processing operation, the image capturing device 100 can align either all of the buffered images or only the selected images.

Figure 3:
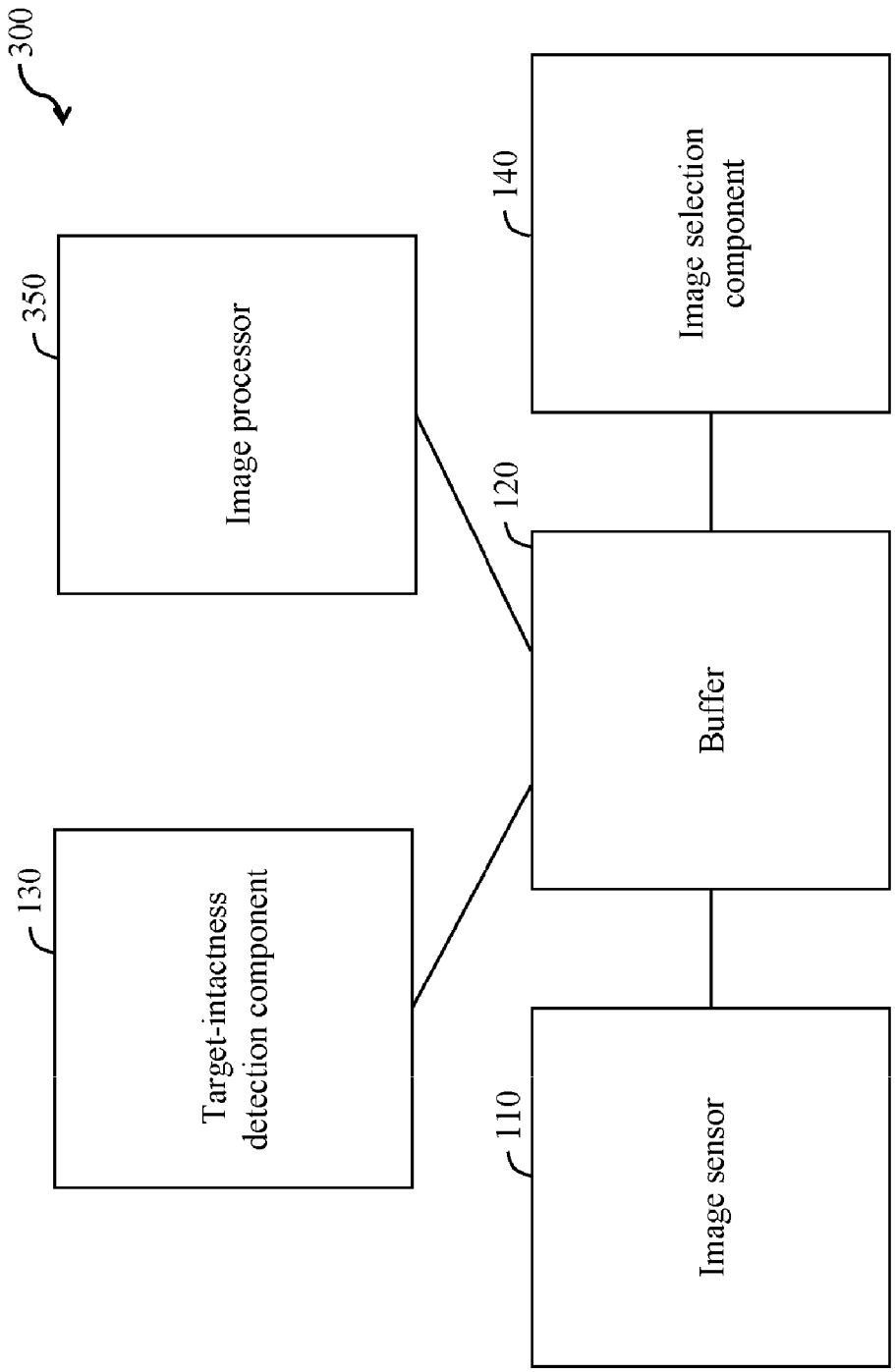
FIG. 3 is a schematic diagram of an image capturing device according to an embodiment of the invention.

The image capturing device 100 can perform the multiple-image processing operation by itself, or let another electronic device perform the operation. To perform the operation by itself, the image capturing device 100 can further include an image processor 350 connected to the buffer 120. With the additional image processor 350, the device 100 becomes an image capturing device 300 shown in FIG. 3. The image processor 350 can be a dedicated hardware, or be embodied by a general purpose processor of the image capturing device 300. The connection between the image processor 350 and the buffer 120 can be either a direct or an indirect connection, and the connection can be either wired or wireless.

High dynamic range (HDR) operation is an example of the multiple-image processing operation mentioned above. If the image selection component 140 needs to select multiple images at step 240 for HDR processing, the image capturing device 100/300 can perform step 210 by using the concept of auto exposure bracketing (AEB) continuously. In other words, the image capturing device 100/300 can change its exposure settings while generating the captured images at step 210.

In another example, step 210 is performed under a low light condition, and each of the images is captured with a fast shutter speed to avoid camera shake. As a result, all the captured images are underexposed. Then, at step 240 the image selection component 140 selects multiple images from the buffered images so that the selected ones can be combined to create a single image that seems to have enough exposure.

Figure 4:
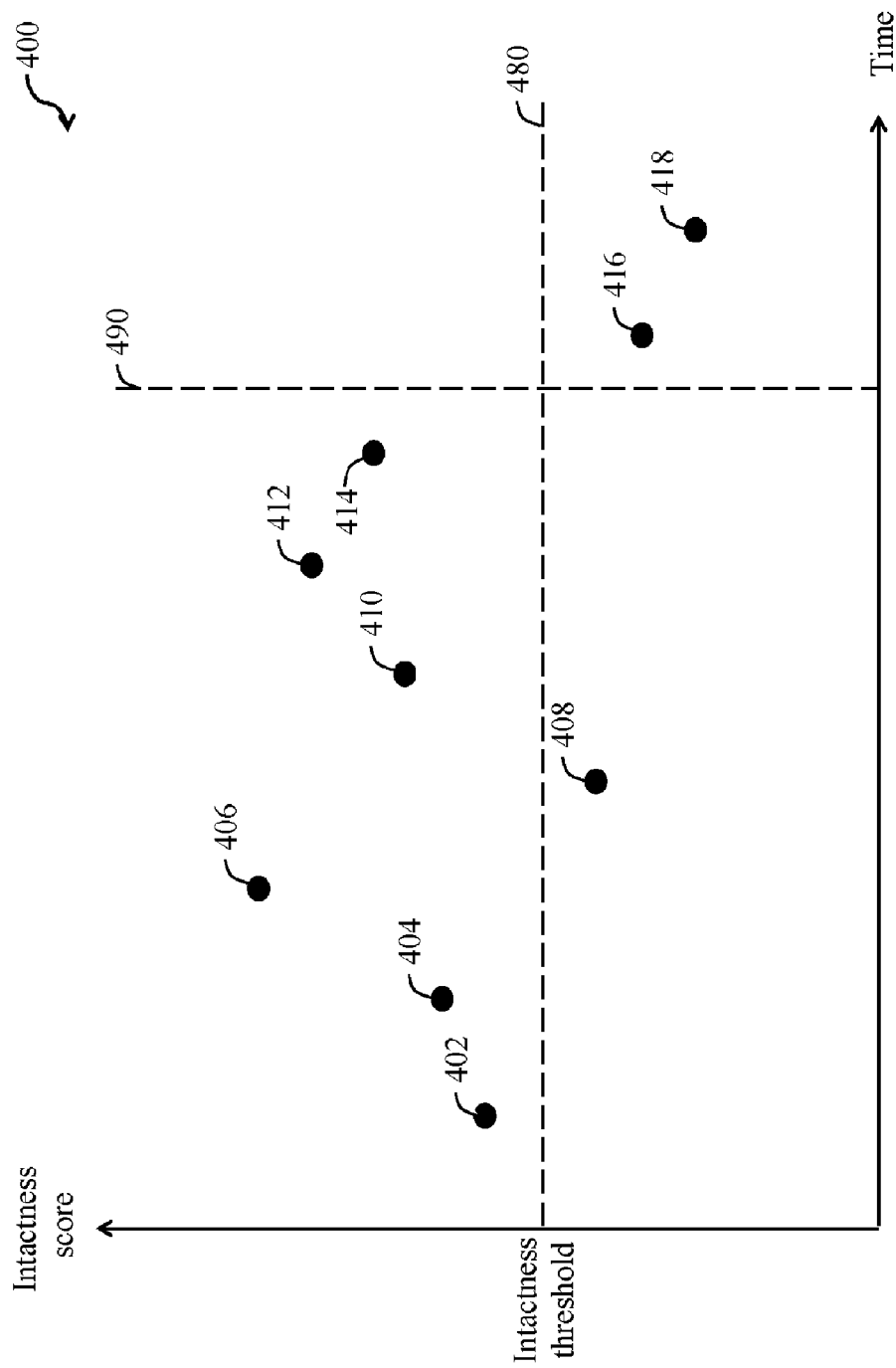
FIG. 4 is a schematic diagram for illustrating how image (s) can be selected in some of the embodiments of the invention.

FIG. 4 is a schematic diagram illustrating how image (s) can be selected at step 240. Diagram 400 includes a time axis and an intactness score axis. Each of the dots 402, 404, . . . , and 418 represents one of the buffered and detected images. Line 480 represents an intactness threshold. Because dots 408, 416, and 418 are below line 480, the interested target is probably covered and hence less intact in the detected images represented by these three dots. Because the dots 402, 404, 406, 410, 412, and 414 are above line 480, the interested target is probably not covered and hence more intact in the detected images represented by these six dots. Line 490 represents the time at which the image capturing device 100 receives an image capturing request. In an application that requires no image capturing request, line 490 can be omitted from FIG. 4.

If only one of the buffered image needs to be selected and step 240 is performed based only on the detected intactness information, the image selection component 140 may select the buffered image represented by dot 406 for its highest intactness score. If step 240 is performed further based on the time stamps associated with the buffered images and the time stamp associated with the image capturing request, the image selection component 140 may select the buffered image represented by dot 414 because it has an acceptable intactness score and is closest to the image capturing request in time.

FIG. 4 can also be used to illustrate how several images can be selected at step 240. Assume that HDR is the application; dots 402, 408, and 414 represent images captured with normal exposure; dots 404, 410, and 416 represent images captured with excessive exposure; dots 406, 412, and 418 represent images captured with insufficient exposure. At step 240, the image selection component 140 can select the buffered image represented by dot 414 because its intactness score is higher than that of dots 402 and 408, select the buffered image represented by dot 410 because its intactness score is higher than that of dots 404 and 416, and select the buffered image represented by dot 406 because its intactness score is higher than that of dots 412 and 418. The selected images, which are represented by dots 414, 410, and 406, can then be combined to create an HDR image.

To avoid additional work load related to image alignment, in the previous example the image selection component 140 can try to select images that are as close in time as possible. For example, at step 240 the image selection component 140 may select the buffered image represented by dots 402, 404, and 406 because they are adjacent in time and their intactness scores are all above the threshold. For the same reason, at step 240 the image selection component 140 may select the captured image represented by dots 410, 412, and 414.

Each process of the invention can serve as the basis of a series of computer program instructions. The computer program instructions can be stored in a machine readable medium. When being executed by an image capturing device, the computer program instructions can cause the image capturing device to perform the process of the invention. Some examples of the machine readable medium include magnetic disks, optical disks, random access memory (RAM), read only memory (ROM), flash memory devices, and phase-change memory.

The aforementioned embodiments can automatically exclude captured images in which the interested target is covered by some other interrupting object(s), and select image(s) in which the interested target is not covered. As a result, these embodiments can prevent the user's time from being wasted on capturing replacement images to replace the captured images in which the interested target is covered. Because undesirable images will be excluded automatically, they will not occupy a part of the limited space of a non-volatile storage used by the image capturing device 100. As a result, the user of the image capturing device 100 can use the limited space of the non-volatile storage more efficiently.

In the foregoing detailed description, the invention has been described with reference to specific exemplary embodiments thereof. It will be evident that various modifications may be made thereto without departing from the spirit and scope of the invention as set forth in the following claims. The detailed description and drawings are, accordingly, to be regarded in an illustrative sense rather than a restrictive sense.

What is claimed is:

1. An image selecting method performed by an image capturing device for selecting at least one image from a sequence of captured images, comprising:
   storing a plurality of the captured images in a buffer, each of the buffered images having an interested region supposed to encompass an interested target;
   detecting intactness information describing intactness of the interested target as encompassed in the interested regions of a plurality of the buffered images; and
   selecting at least one of the buffered images based on the detected intactness information;
   wherein intactness indicating whether or to what extent the interested target encompassed in the interested region.

2. The method of claim 1, wherein the detection step comprises:
   detecting whether the interested target is covered in any of the interested regions of the detected images.

3. The method of claim 1, wherein the detection step comprises:
   detecting whether an interrupting object has entered into any of the interested regions of the detected images.

4. The method of claim 1, wherein the detection step comprises:
   comparing the interested regions of the detected images to detect the intactness information.

5. The method of claim 1, wherein the detection step comprises:
   associating an intactness score with each of the interested regions of the detected images, the intactness score indicating whether and to what extent the interested target is covered in the associated interested region.

6. The method of claim 1, wherein the selection step comprises:
   selecting the at least one of the buffered images based on the detected intactness information, time stamps associated with the buffered images, and a time stamp associated with an image capturing request received by the image capturing device.

7. The method of claim 1, further comprising:
   performing a multiple-image processing operation on the selected images.

8. The method of claim 7, wherein the multiple-image processing operation is a high dynamic range (HDR) operation.

9. The method of claim 1, wherein the image capturing device comprises an image sensor, a target-intactness detection component, and an image selection component, and the image capturing device using the image sensor to capture the images, performs the detection step using the target-intactness detection component, and performs the selection step using the image selection component.

10. An image selecting device used in an image capturing device which comprises an image sensor operative to capture a sequence of images, the image selecting device used for selecting at least one image from the sequence of captured images, the image selecting device comprising:
    a buffer connected to the image sensor, operative to store a plurality of the captured images, each of the buffered images having an interested region supposed to encompass an interested target;
    a target-intactness detection component connected to the buffer, operative to detect intactness information describing intactness of the interested target as encompassed in the interested regions of a plurality of the buffered images; and
    an image selection component connected to the buffer, operative to select at least one of the buffered images based on the detected intactness information;
    wherein intactness indicating whether or to what extent the interested target encompassed in the interested region.

11. The image selecting device of claim 10, wherein the target-intactness detection component is operative to detect whether the interested target is covered in any of the interested regions of the detected images.

12. The image selecting device of claim 10, wherein the target-intactness detection component is operative to detect whether an interrupting object has entered into any of the interested regions of the detected images.

13. The image selecting device of claim 10, wherein the target-intactness detection component is operative to detect the intactness information by comparing the interested regions of the detected images.

14. The image selecting device of claim 10, wherein the target-intactness detection component is operative to associate an intactness score with each of the interested regions of the detected images, and the intactness score indicates whether and to what extent the interested target is covered in the associated interested region.

15. The image selecting device of claim 10, wherein the image selection component is operative to select the at least one of the buffered images based on the detected intactness information, time stamps associated with the buffered images, and a time stamp associated with an image capturing request received by the image capturing device.

16. The image selecting device of claim 10, further comprising an image processor connected to the buffer, operative to perform a multiple-image processing operation on the selected images.

17. The image selecting device of claim 16, wherein the multiple-image processing operation is a high dynamic range (HDR) operation.

18. A non-transitory machine readable medium comprising executable computer program instructions which when executed by an image capturing device cause the device to perform a method after capturing a sequence of images, the method comprising:
    storing a plurality of the captured images in a buffer, each of the buffered images having an interested region supposed to encompass an interested target;
    detecting intactness information describing intactness of the interested target as encompassed in the interested regions of a plurality of the buffered images; and
    selecting at least one of the buffered images based on the detected intactness information;
    wherein intactness indicating whether or to what extent the interested target encompassed in the interested region.

19. The medium of claim 18, wherein the detection step comprises:
    detecting whether the interested target is covered in any of the interested regions of the detected images.

20. The medium of claim 18, wherein the detection step comprises:
    detecting whether an interrupting object has entered into any of the interested regions of the detected images.

* * * * *